US011190683B2

(12) United States Patent
Tanaka et al.

(10) Patent No.: US 11,190,683 B2
(45) Date of Patent: Nov. 30, 2021

(54) IMAGE CAPTURE APPARATUS AND CONTROL METHOD THEREFOR

(71) Applicant: CANON KABUSHIKI KAISHA, Tokyo (JP)

(72) Inventors: Ryosuke Tanaka, Kawasaki (JP); Yuya Ebata, Fujisawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/866,673

(22) Filed: May 5, 2020

(65) Prior Publication Data

US 2020/0358950 A1 Nov. 12, 2020

(30) Foreign Application Priority Data

May 8, 2019 (JP) .............................. JP2019-088567
Feb. 10, 2020 (JP) .............................. JP2020-020887

(51) Int. Cl.
*H04N 5/232* (2006.01)

(52) U.S. Cl.
CPC ..... *H04N 5/23227* (2018.08); *H04N 5/23245* (2013.01); *H04N 5/23293* (2013.01)

(58) Field of Classification Search
CPC ........... H04N 5/23227; H04N 5/23245; H04N 5/23293
See application file for complete search history.

(56) References Cited

U.S. PATENT DOCUMENTS

2008/0273754 A1* 11/2008 Hick ................ G08B 13/19652
382/103

FOREIGN PATENT DOCUMENTS

JP 2012-044566 A 3/2012

* cited by examiner

*Primary Examiner* — Twyler L Haskins
*Assistant Examiner* — Fayez A Bhuiyan
(74) *Attorney, Agent, or Firm* — Cowan, Liebowitz & Latman, P.C.

(57) ABSTRACT

An image capture apparatus comprises an image sensor and an adjustment circuit that adjusts a drive timing of the image sensor. The adjustment circuit, in a case where a second drive time period, which is a drive time period of the image sensor for still image shooting, overlaps with a first drive time period, which is a drive time period of the image sensor for moving image shooting, changes a start timing of the second drive time period to a timing that is based on a movement direction and a movement amount of a main subject.

15 Claims, 11 Drawing Sheets

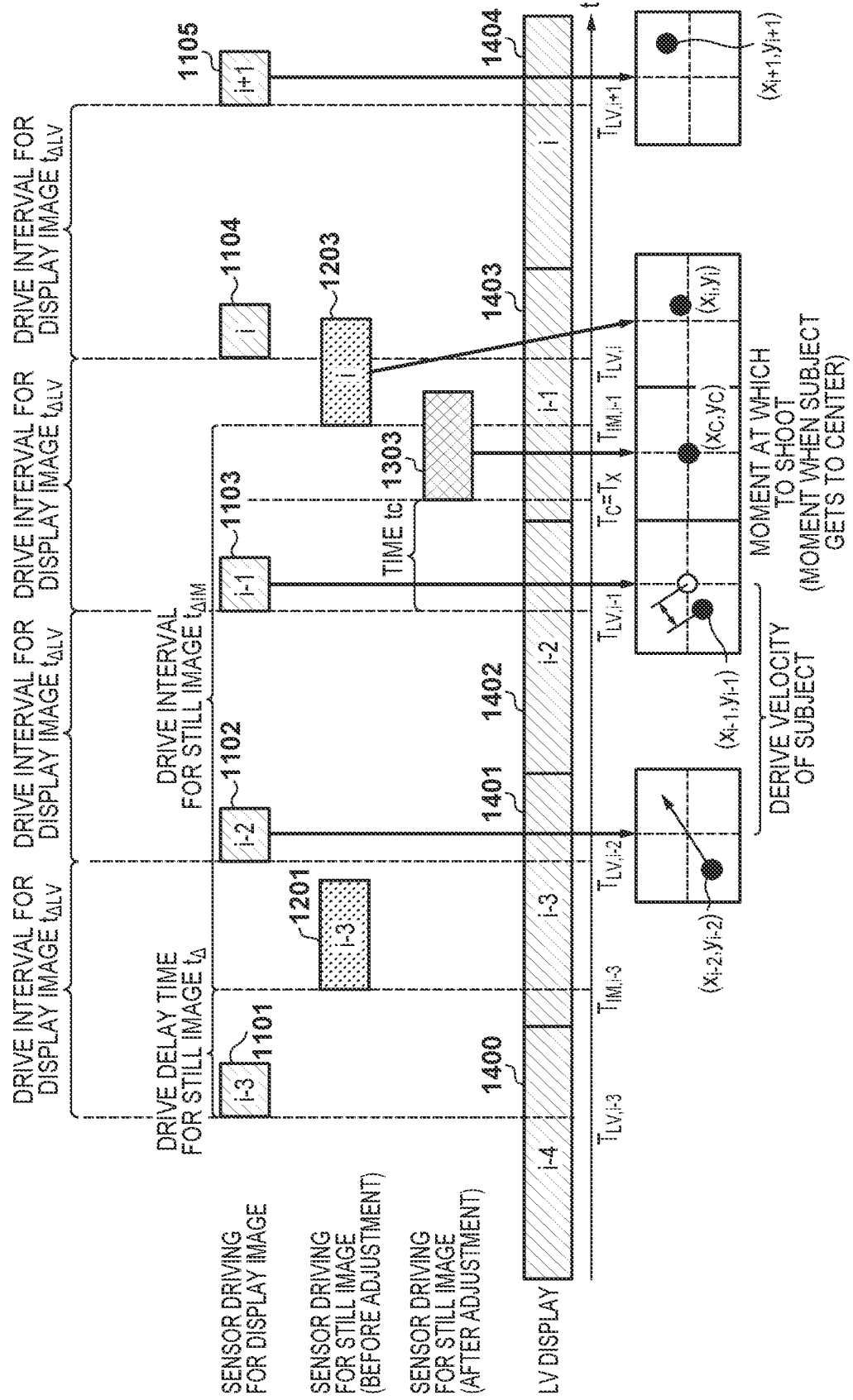

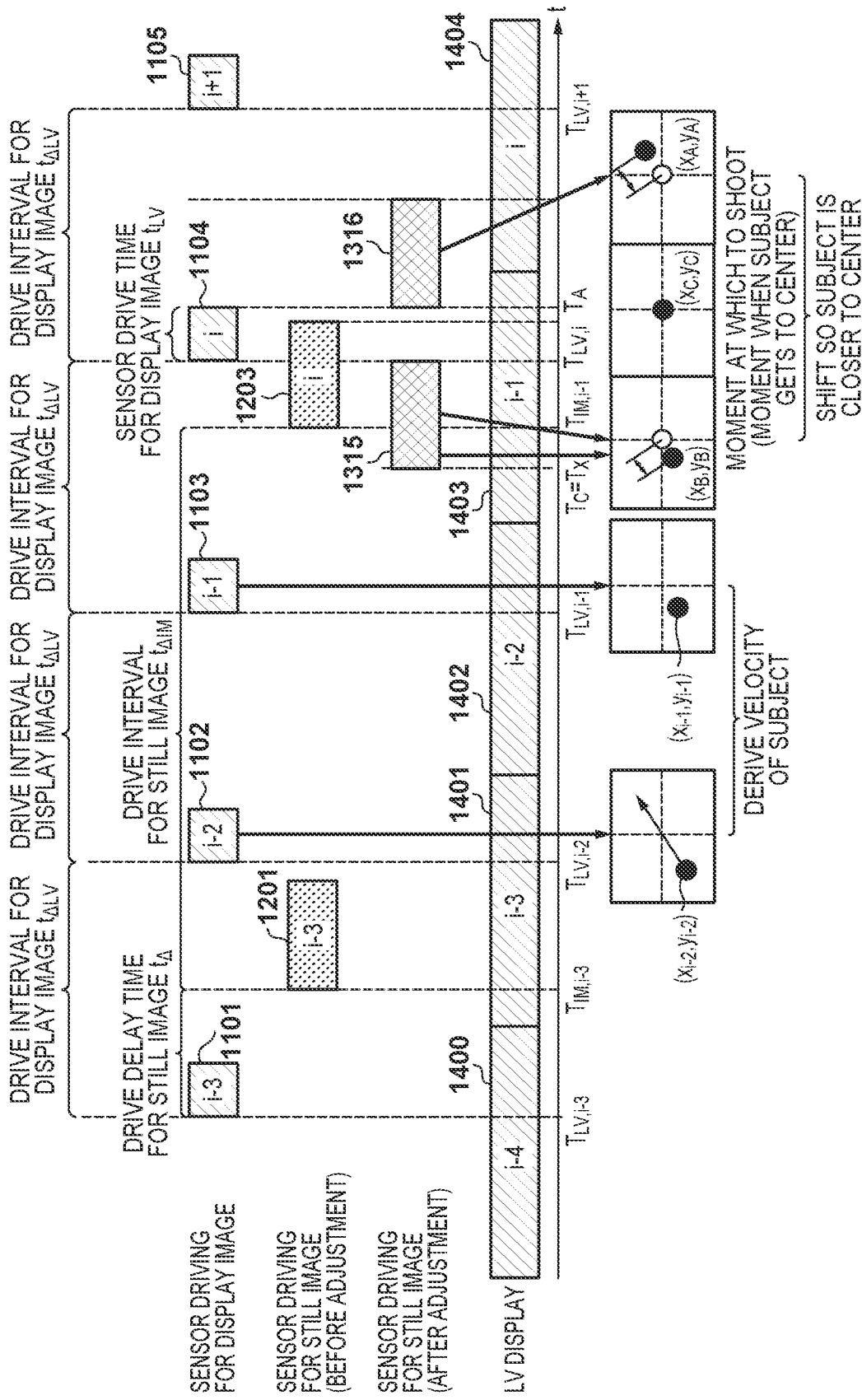

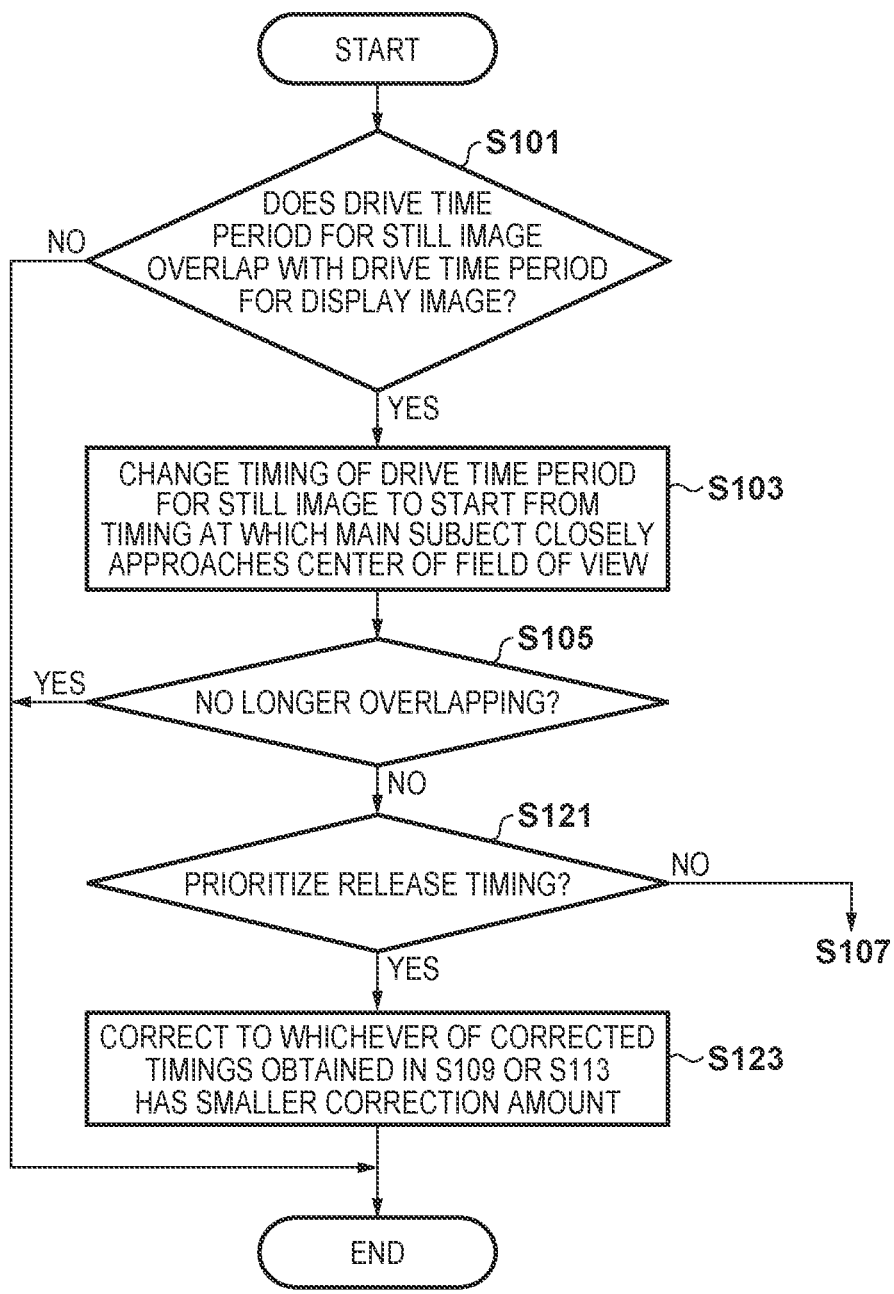

IMAGE CAPTURE APPARATUS AND CONTROL METHOD THEREFOR

BACKGROUND OF THE INVENTION

Field of the Invention

The present invention relates to an image capture apparatus and a control method therefor, and more particularly to an image capture apparatus capable of shooting still images during moving image shooting and a control method therefor.

Description of the Related Art

There are digital cameras and electronic devices provided with a camera function (hereinafter, referred to collectively as image capture apparatuses) that have a live view (LV) function. The LV function causes a display device that displays moving images to function as a viewfinder, by executing moving image shooting in parallel with display of the moving images obtained by the moving image shooting. The user is able to adjust the shooting range of moving images and still images for performing recording, using the moving images that are displayed by the LV function.

Generally, since resolution and the like differ between still image data and moving image data, the operations of the image sensor also differ between the time of still image shooting and the time of moving image shooting. In the case of using the same image sensor for moving image shooting and still image shooting, the operations of the image sensor need to be switched according to the type of image being shot. Depending on the timing of still image shooting, moving image shooting may need to be suspended, in which case adverse effects occur, such as live view display being suspended and the update frequency of display images decreasing.

Japanese Patent Laid-Open No. 2012-44566 discloses switching the readout method of the image sensor and the method of generating data for display depending on whether or not a predetermined condition, such as insufficient buffer capacity, is met during continuous shooting. Specifically, if the condition is not met, all the pixels are read out from the image sensor to generate still image data for recording, and data for display is generated from the still image data for recording. Also, when the condition is met, the data amount to be read out from the image sensor is reduced, and data for display is generated without generating still image data for recording. In Japanese Patent Laid-Open No. 2012-44566, a configuration is thereby adopted in which data for display is updated even during continuous shooting.

However, with the method of Japanese Patent Laid-Open No. 2012-44566, as shown in the column of the display image 450 in FIG. 4 thereof, the update frequency of data for display is completely different between the case where the condition is met during continuous shooting (live view time period) and the case where the condition is not met (recording image shooting time period). Moreover, old data for display (AV2 (N−1)) is displayed again after the live view time period.

SUMMARY OF THE INVENTION

The present invention has been made in view of such problems with the conventional technology. The present invention, according to one aspect thereof, provides an image capture apparatus capable of suppressing the influence of still image shooting on moving image shooting and a control method therefor.

According to an aspect of the present invention, there is provided an image capture apparatus comprising: an image sensor; and an adjustment circuit that adjusts a drive timing of the image sensor, wherein the adjustment circuit, in a case where a second drive time period, which is a drive time period of the image sensor for still image shooting, overlaps with a first drive time period, which is a drive time period of the image sensor for moving image shooting, changes a start timing of the second drive time period to a timing that is based on a movement direction and a movement amount of a main subject.

According to another aspect of the present invention, there is provided a control method for an image capture apparatus that includes an image sensor, the method comprising: changing, in a case where a second drive time period, which is a drive time period of the image sensor for still image shooting, overlaps with a first drive time period, which is a drive time period of the image sensor for moving image shooting, a start timing of the second drive time period to a timing that is based on a movement direction and a movement amount of a main subject.

According to a further aspect of the present invention, there is provided a non-transitory computer-readable storage medium storing a computer program for causing a computer included in an image capture apparatus to execute a control method of the image capture apparatus, the method comprising: changing, in a case where a second drive time period, which is a drive time period of the image sensor for still image shooting, overlaps with a first drive time period, which is a drive time period of the image sensor for moving image shooting, a start timing of the second drive time period to a timing that is based on a movement direction and a movement amount of a main subject.

Further features of the present invention will become apparent from the following description of exemplary embodiments (with reference to the attached drawings).

BRIEF DESCRIPTION OF THE DRAWINGS

FIGS. 3A and 3B are timing charts relating to timing control operations of drive time periods according to a first embodiment.

FIGS. 4A and 4B are timing charts relating to timing control operations of drive time periods according to the first embodiment.

FIG. 9 is a flowchart relating to timing control operations of drive time periods according to a variation of the first embodiment.

DESCRIPTION OF THE EMBODIMENTS

Figure 1:
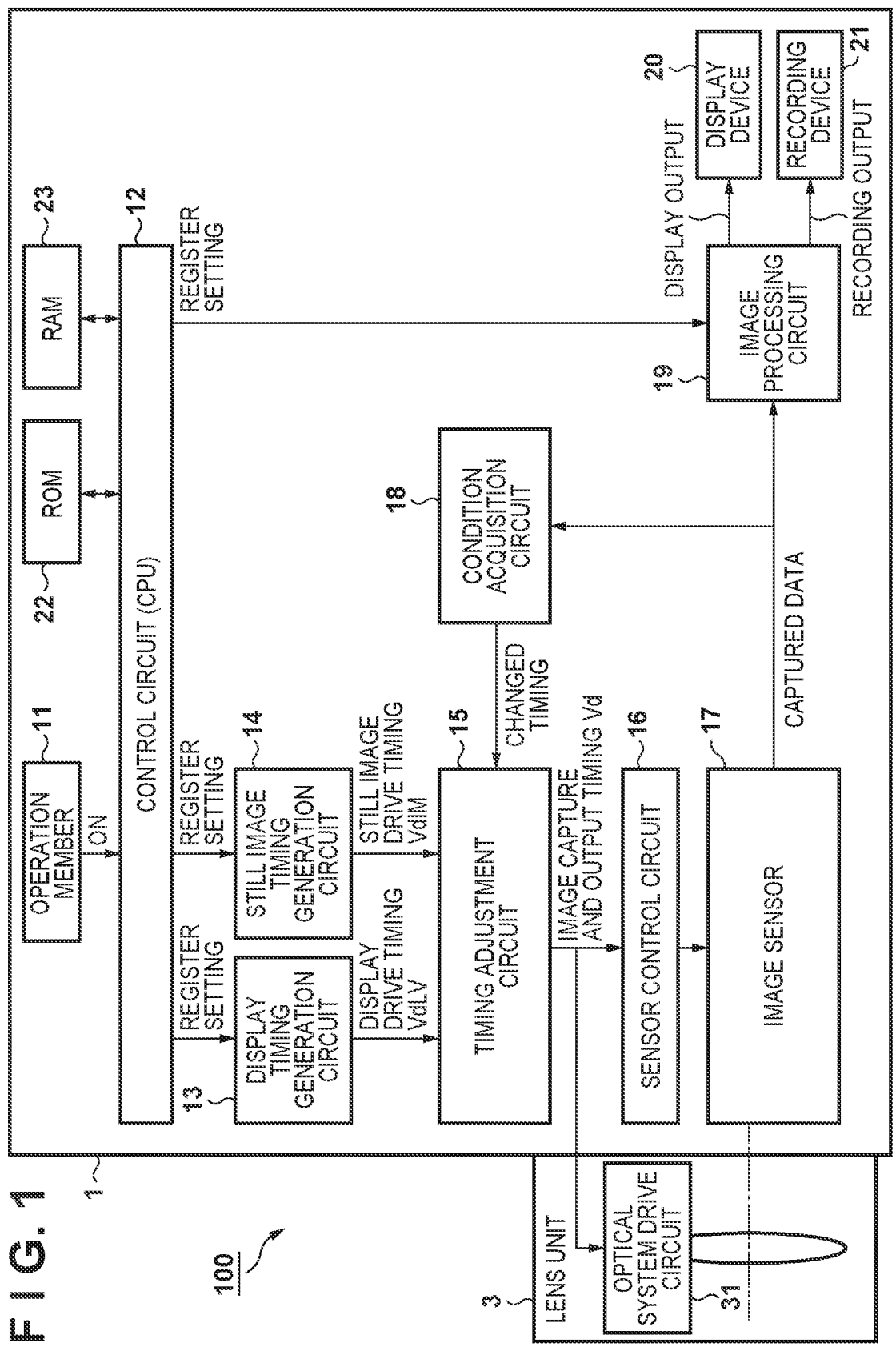
FIG. 1 is a block diagram showing an example functional configuration of an image capture apparatus according to an embodiment.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

The following embodiments describe examples in which the present invention is applied to an image capture apparatus such as a digital camera. However, the present invention is applicable to any electronic device having an image capture function capable of shooting still images during moving image shooting using a single image sensor. Such electronic devices include video cameras, computer devices (personal computers, tablet computers, media players, PDAs, etc.), mobile phones, smartphones, game machines, robots, drones, and drive recorders. These are illustrative examples, and the present invention is also applicable to other electronic devices.

First Embodiment

FIG. 1 is a block diagram showing an example functional configuration of the image capture apparatus according to a first embodiment. An image capture apparatus 100 is constituted by a main body 1 and a lens unit 3. The lens unit 3 may be detachable from the main body 1 or may be fixed to the main body 1.

An operation member 11 is a general term for a group of input devices for a user to give instructions to the image capture apparatus 100. For example, the operation member 11 can include a release button, a power switch, a moving image shooting button, a mode dial, arrow keys, an OK button, and a menu button.

A control circuit 12 has a CPU, and loads programs stored in a ROM 22 to a RAM 23 and executes the loaded programs, for example. Note that a FPGA (field-programmable gate array), which is a programmable processor, may be used instead of the CPU. The control circuit 12 realizes the functions of the image capture apparatus 100, by controlling the operations of the main body 1 and the lens unit 3. The ROM 22 is, for example, a rewritable nonvolatile memory, and stores programs executable by the CPU of the control circuit 12, setting values, GUI data, and the like. The RAM 23 is used for purposes such as loading programs to be executed by the CPU of the control circuit 12 and for saving values required during execution of programs. The RAM 23 is also used as a buffer memory for temporarily saving image data to be processed by an image processing circuit 19. Furthermore, part of the RAM 23 is used as a video memory for storing image data to be displayed on a display device 20.

A display timing generation circuit 13 generates a timing signal (VdLV signal) at the time of driving an image sensor 17 in order to generate images for display. A still image timing generation circuit 14 generates a timing signal (VdIM signal) at the time of driving the image sensor 17 in order to generate still images for recording. A timing adjustment circuit 15 (an adjustment circuit) adjusts the drive timing of the image sensor 17, based on the VdLV signal, the VdIM signal and a timing signal that is supplied from a condition acquisition circuit 18, and outputs a drive timing signal Vd. A sensor control circuit 16 controls the operations of the image sensor based on the drive timing signal Vd output by the timing adjustment circuit 15.

The image sensor 17 is a CMOS image sensor, for example. A plurality of pixels each having a photoelectric conversion unit are disposed in the image sensor 17. The image sensor 17 converts an optical image that is formed by the lens unit 3 into an electrical signal (analog image data) with a plurality of pixels. The image sensor 17 then performs A/D conversion on the analog image data, and outputs the resultant data as digital image data (hereinafter, simply referred to as image data).

The image processing circuit 19 applies predetermined image processing to the image data that is output by the image sensor 17, and performs processing such as generating signals and image data that depend on the use application and acquiring and/or generating various types of information. The image processing circuit 19 may be dedicated hardware circuit such as an ASIC designed to realize a specific function, or may be a configuration for realizing a specific function due to a programmable processor such as a DSP executing software.

Here, image processing that is applied by the image processing circuit 19 includes preprocessing, color interpolation processing, correction processing, detection processing, data processing, and evaluation value calculation processing. The preprocessing includes signal amplification, reference level adjustment, and defective pixel correction. The color interpolation processing is processing for interpolating the value of color components that are not included in image data read out from pixels, and is also referred to as demosaic processing. The correction processing includes white balance adjustment, processing for correcting the brightness of images, processing for correcting aberration in the optical system of the lens unit 3, and processing for correcting color. The detection processing involves detection of a feature region (e.g., face region, body region) and motion thereof, human recognition processing, and the like. The data processing includes scaling processing, encoding and decoding processing, and header information generation processing. The evaluation value calculation processing is processing for calculating evaluation values to be used in operations of the control circuit 12, such as a pair of image signals for phase difference AF (auto focus detection), evaluation values for contrast AF, and evaluation values to be used in auto exposure control (AE). Note that such image processing is illustrative of image processing that can be implemented by the image processing circuit 19, and the present invention is not limited to the image processing that is implemented by the image processing circuit 19.

The condition acquisition circuit 18 (a prediction circuit, a correction circuit) generates a timing signal that is based on information of a main subject, from the image data that is output by the image sensor 17. The condition acquisition circuit 18 outputs the timing signal to the timing adjustment circuit 15. The configuration and operations of the condition acquisition circuit 18 will be described in detail later.

The display device 20 is provided with a liquid crystal display or an organic EL display, for example, and displays images that are based on the image data for display generated by the image processing circuit 19. The image data for display is generated based on shot images, reproduced images, and GUI images.

A recording device 21 records moving image data and still image data for recording that are output by the image processing circuit 19 to a recording medium such as a memory card in accordance with a prescribed filesystem. Also, the recording device 21 reads out image data recorded on the recording medium, and outputs the read image data to the image processing circuit 19.

The optical system drive circuit 31 drives a moving lens that is included in the lens unit 3. The moving lenses that is included in the lens unit 3 can differ according to the configuration of the lens unit 3. Typical moving lenses include a focus lens, a zoom lens, and a shift lens.

Note that one or more of the display timing generation circuit 13, the still image timing generation circuit 14, the timing adjustment circuit 15, the sensor control circuit 16, the condition acquisition circuit 18 and the image processing circuit 19 may be realized by the CPU of the control circuit 12 executing a program. Alternatively, each of these functional blocks or a plurality thereof may be realized by one piece of hardware circuit such as an ASIC.

Next, the shooting operation of the image capture apparatus 100 will be described. Here, the image capture apparatus 100 is assumed to be operating in a still image shooting mode, and to be in a standby state waiting for input of a still image shooting instruction through the operation member 11. Also, it is assumed that, in the standby state, live view display is performed on the display device 20. Live view display is realized by continuously displaying moving images obtained through shooting on the display device 20, while performing moving image shooting at a prescribed framerate (e.g., 30 fps).

Figure 3B:
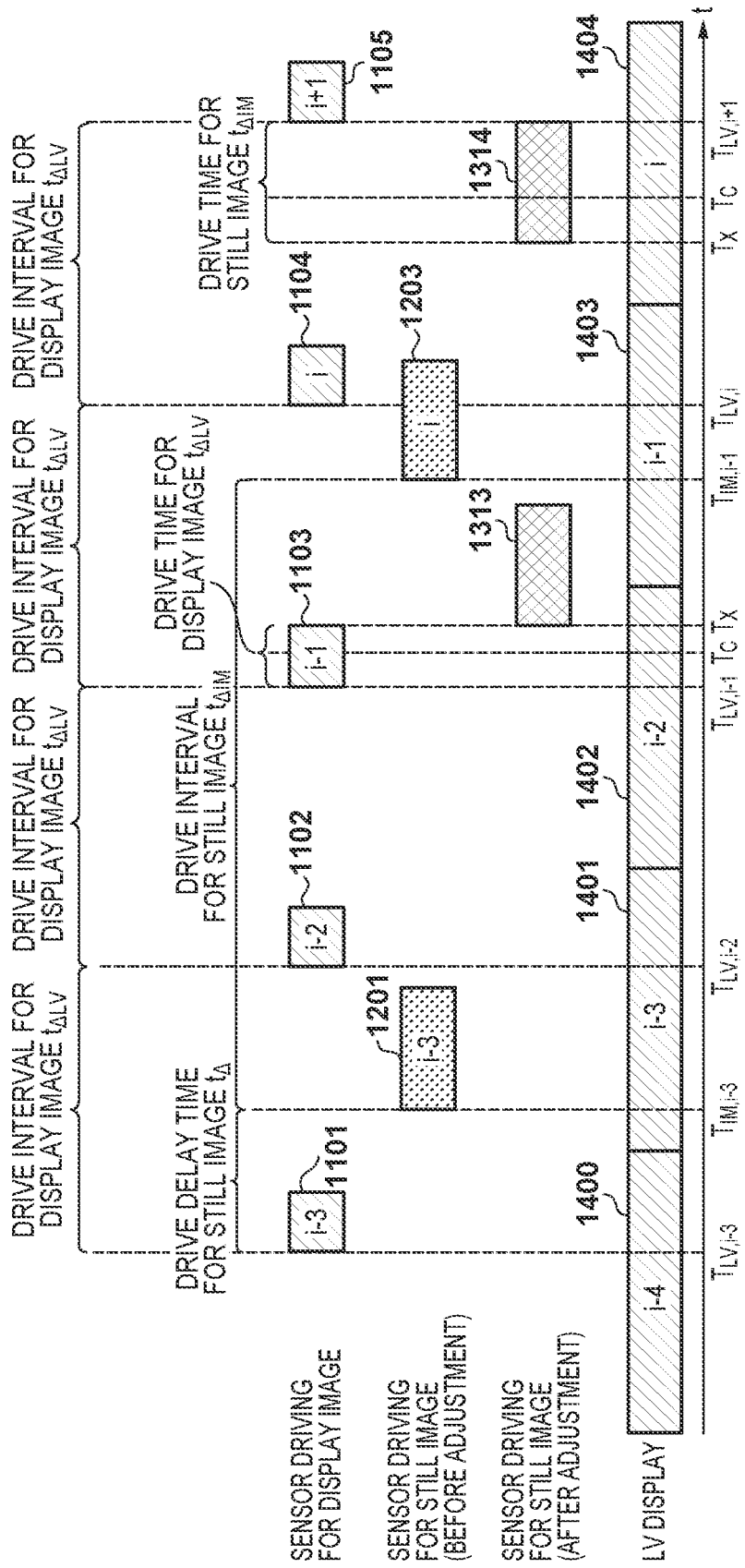

Note that the operations of the display timing generation circuit 13 and the still image timing generation circuit 14 are controlled by setting of an internal register. This setting is, for example, implemented by the control circuit 12 in startup processing of the image capture apparatus 100. For example, the following values in the timing charts shown in FIGS. 3A and 3B are controlled by the setting values in the registers.

frame period of moving image shooting for live view display (drive interval for a display image $t_{\Delta LV}$)

shooting period at the time of continuous shooting (drive interval for a still image $t_{\Delta IM}$)

difference between start timing of initial still image shooting and start timing of immediately previous moving image shooting (drive delay time for a still image $t_A$)

The display timing generation circuit 13 outputs the VdLV signal showing the start timing of the drive time period for a display image (first drive time period) to the timing adjustment circuit 15, based on the register settings.

When the still image shooting instruction by the operation member 11 is not detected, the still image timing generation circuit 14 does not output the VdIM signal. Accordingly, the timing adjustment circuit 15 outputs the VdLV signal directly to an optical system drive circuit 31 and the sensor control circuit 16 as the drive timing signal Vd.

The optical system drive circuit 31 performs lens driving for display shooting according to the drive timing signal Vd. The image sensor 17 performs exposure and readout (output) operations in the drive time period for a display image under the control of the sensor control circuit 16. The image sensor 17 outputs one frame of data of the image obtained by shooting to the condition acquisition circuit 18 and the image processing circuit 19.

The condition acquisition circuit 18 detects a region of the main subject from the image data of each frame that is supplied by the image sensor 17, and supplies the movement direction and movement amount thereof. Also, the condition acquisition circuit 18 predicts the timing at which the main subject will most closely approach a specific position within the visual field or field of view (here, center of the visual field or field of view), and outputs the predicted timing to the timing adjustment circuit 15. The image processing circuit 19 generates live view image data from the image data that is input from the image sensor 17, and outputs the image data to the display device 20. The display device 20 sequentially displays the image that is input from the image processing circuit 19.

Upon the shooting instruction by the operation member 11 being detected, the control circuit 12 configures the settings in the register of the still image timing generation circuit 14. The still image timing generation circuit 14 outputs the VdIM signal indicating the start timing of the drive time period for a still image (second drive time period) to the timing adjustment circuit 15 based on the register settings. In the case where the shooting instruction is continuously input (at the time of continuous shooting), the still image timing generation circuit 14 outputs the VdIM signal every drive interval for a still image $t_{\Delta IM}$.

The timing adjustment circuit 15 changes the start timing of the drive time period for a still image, in the case where the drive time period for a still image overlaps with the drive time period for a display image. The timing adjustment circuit 15 then outputs the start timing of the drive time period for a still image to the optical system drive circuit 31 and the sensor control circuit 16. The operations of the condition acquisition circuit 18 and the timing adjustment circuit 15 will be described in detail later.

The optical system drive circuit 31 performs lens driving following still image shooting at the timing provided from the timing adjustment circuit 15. The image sensor 17 executes exposure and readout operations under the control of the sensor control circuit 16. The image sensor 17 outputs the obtained still image data to the image processing circuit 19. In the image processing circuit 19, the captured data that is input from the image sensor 17 is processed, and a still image data file is generated and output to the recording device 21. The recording device 21 records the still image data file that is input from the image processing circuit 19 to a recording medium.

Figure 2:
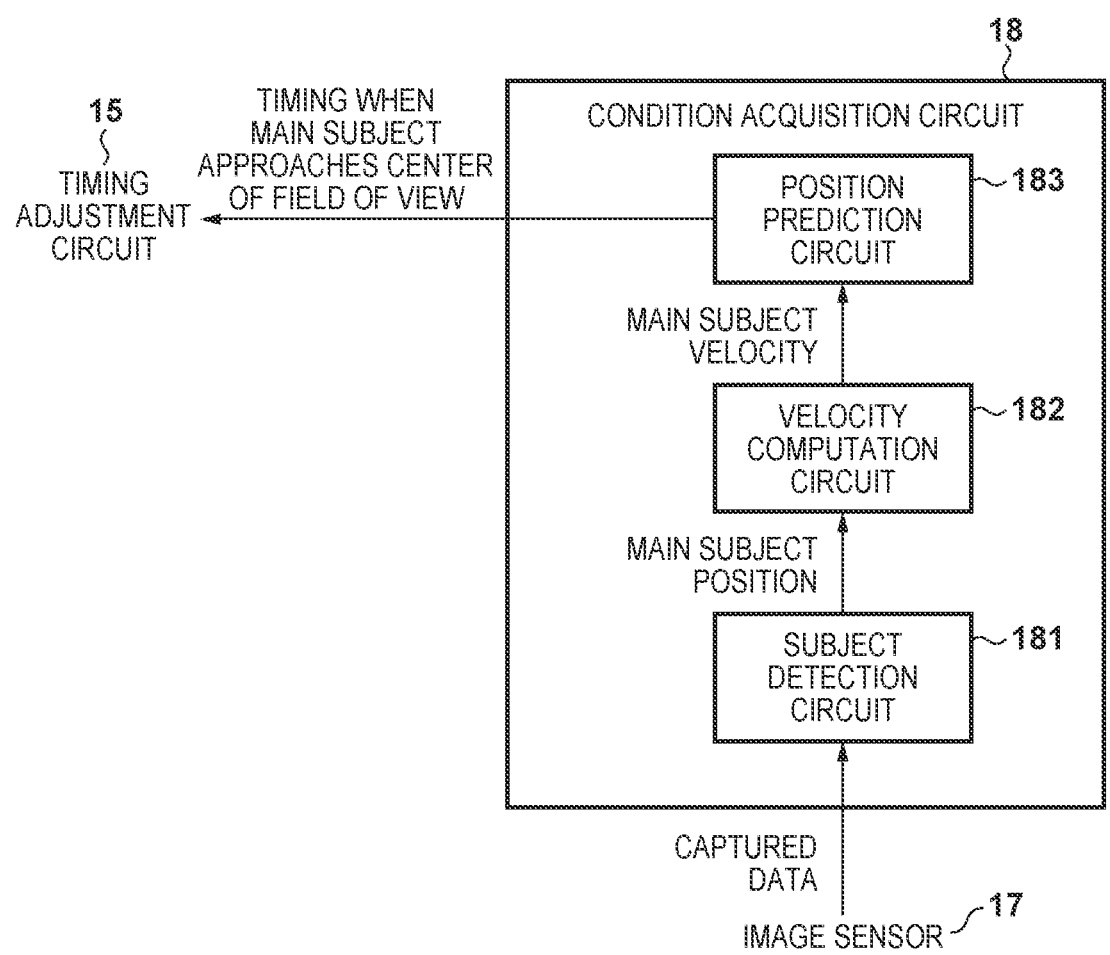
FIG. 2 is a block diagram showing an example functional configuration of condition acquisition circuit in an embodiment.

FIG. 2 is a block diagram showing an example functional configuration of the condition acquisition circuit 18. The condition acquisition circuit 18 has a subject detection circuit 181, a velocity computation circuit 182, and a position prediction circuit 183. The subject detection circuit 181 executes subject detection processing on the image data that is output by the image sensor 17, and detects the position and size of an image region of the main subject. The main subject that is detected by the subject detection circuit 181 may be a subject that has a specific feature, such as the face of a person or animal, for example. The main subject is not particularly restricted, and any subject detectable with a known image processing technology can be detected as the main subject. For example, a feature region that is closest to the middle of the image may be detected as the region of the main subject, or a region with the greatest similarity to a specific region designated by the user in advance may be detected as the main subject region.

The velocity computation circuit 182 derives the movement velocity and movement direction of the main subject region detected by the subject detection circuit 181. The movement velocity can be derived based on the difference between the shooting time of two moving image frames in which the subject region is detected and the amount of movement of the subject region, for example. The operations of the velocity computation circuit 182 will be described in detail later.

The position prediction circuit 183 predicts the timing at which the main subject region will most closely approach the specific position in the visual field or field of view (here, center of the field of view), based on the movement velocity and movement direction detected by the velocity computation circuit 182. The position prediction circuit 183 outputs the predicted timing to the timing adjustment circuit 15. The operations of the position prediction circuit 183 will be described in detail later.

Next, operations of the condition acquisition circuit 18 and the timing adjustment circuit 15 will be described.

FIG. 3A is a diagram schematically showing the timing of LV display, and the time periods and timing control of the shooting operation for display and the still image shooting operation in the case where the still image shooting instruction is continuously input during live view (LV) display (continuous shooting). The horizontal axis is a time axis and time progresses from left to right in the diagram.

Reference numerals 1101 to 1105 denote drive time periods (drive time period for a display images) of the image sensor 17 for acquiring five moving image frames from frame (i−3) to frame (i+1) as live view images.

Reference signs 1201 and 1203 show the drive time period (drive time period for a still image) of the image sensor 17 for the still image shooting, in the case where input of the still image shooting instruction is continuously detected (at the time of continuous shooting). Note that the drive time periods 1201 and 1203 indicate a standard timing in which there is no change in timing. On the other hand, reference sign 1303 indicates a drive time period for a still image after the timing is changed, due to the drive time period for a still image 1203 overlapping with the drive time period for a display image 1104.

Note that, as described above, the following values shown in FIGS. 3A and 3B are controlled by setting of the registers in the display timing generation circuit 13 and the still image timing generation circuit 14.

frame period of moving image shooting for live view display (drive interval for a display image $t_{\Delta LV}$)

shooting period at time of continuous shooting (drive interval for a still image $t_{\Delta IM}$)

difference between start timing of initial still image shooting and immediately previous moving image shooting start timing (drive delay time for a still image $t_A$)

Accordingly, the start timing of still image shooting at the time of continuous shooting is determined by $t_A + t_{\Delta IM} \times n$ (n=1, 2, 3, . . . ), on the basis of moving image shooting start timing immediately before performing the initial still image shooting.

Reference numerals 1400 to 1404 indicate moving image frames of live view images to be displayed on the display device 20. A moving image frame (i−3) shot in the drive time period for a display image 1101 is displayed on the display device 20 as a live view image (i−3) in the time period of the moving image frame 1401. This similarly applies to the other frames.

A subject detection circuit 181 executes subject detection processing on the individual moving image frames that are shot in the drive time periods 1101 to 1105. Here, the main subject is first detected from an (i−2) frame shot in the drive time period for a display image 1102.

The velocity computation circuit 182 derives the velocity of the main subject, based on the position of the main subject region detected in the (i−2) frame and the (i−1) frame. The velocity computation circuit 182 derives velocities $v_{x,i-1}$ and $v_{y,i-1}$ of the main subject in the x direction and the y direction at a shooting start time $T_{LV,i-1}$ of the drive time period for a display image 1103 of the (i−1) frame with the following equation (1).

$$\begin{cases} v_{x,i-1} = \dfrac{x_{i-1} - x_{i-2}}{t_{\Delta LV}} \\ v_{y,i-1} = \dfrac{y_{i-1} - y_{i-2}}{t_{\Delta LV}} \end{cases} \qquad (1)$$

In equation (1), $x_{i-1}$, $y_{i-1}$, and $x_{i-2}$, $y_{i-2}$ are respectively positions (x-coordinate and y-coordinate) of the main subject in the live view images of the (i−1) frame and the (i−2) frame. Also, $t_{\Delta LV}$ is the moving image shooting interval (frame period) of the image sensor 17.

The position prediction circuit 183 derives, based on equation (2), a predicted position x(t), y(t) of the main subject at a time t with $T_{LV,i-1}$ as the starting point, from the velocities $v_{x,i-1}$ and $v_{y,i-1}$ of the main subject calculated by the velocity computation circuit 182.

$$\begin{cases} x(t) = x_{i-1} + v_{x,i-1} t \\ y(t) = y_{i-1} + v_{y,i-1} t \end{cases} \qquad (2)$$

The position prediction circuit 183 derives, based on equation (3), a distance d(t) from the main subject to a specific position within the field of view (here, center of the field of view), from the position x(t), y(t) of the main subject at time t.

$$d(t) = \sqrt{\{x_c - x(t)\}^2 + \{y_c - y(t)\}^2} \qquad (3)$$

Here, $x_c$ and $y_c$ indicate the coordinates of the center of the field of view.

The position prediction circuit 183 then derives the time t at which d(t) is a minimum as $t_c$. The position prediction circuit 183 derives a time $T_C$ at which the main subject most closely approaches the center of the field of view, based on the calculated $t_c$, in accordance with the following equation (4).

The condition acquisition circuit 18 supplies the time $T_C$ derived by the position prediction circuit 183 to the timing adjustment circuit 15 as a timing $T_X$.

$$T_X = T_C = T_{LV,i-1} + t_c \qquad (4)$$

Here, the case where the drive time period for a still image changed so as to start from time $T_C$, due to overlapping with the drive time period for a display image 1104 prior to the timing change still overlaps with one of the drive time period for a display images 1103, 1104 and 1105 will be considered. In this case, the position prediction circuit 183 corrects $T_X$ as follows from a state of being equal to $T_C$. In the following description, $t_{LV}$ is the length of the drive time period for a display image, and $t_{\Delta IM}$ is the length of the drive time period for a still image.

Case A $T_C \leq T_{LV,i-1} + t_{LV}$

In this case, the drive time period for a still image starting from $T_C$ overlaps with the drive time period for a display image 1103. Thus, the position prediction circuit 183, as shown by reference numeral 1313 in FIG. 3B, corrects the timing of the drive time period for a still image 1203 to start after (here, immediately after) the end of the drive time period for a display image 1103 and so as to not overlap with other drive time period for a display images. The position prediction circuit 183 derives the start timing $T_X$ after correction (first start timing) by the following equation (5).

$$T_X = T_{LV,i-1} + t_{LV} \qquad (5)$$

Case B
$T_C > T_{LV,i+1} - t_{IM}$

In this case, the drive time period for a still image starting from $T_C$ overlaps with the drive time period for a display image 1105. Thus, the position prediction circuit 183, as shown by reference numeral 1314 in FIG. 3B, corrects the timing of the drive time period for a still image 1203 to end before (here, immediately before) the start of the drive time period for a display image 1105 and so as to not overlap with other drive time period for a display images. The position prediction circuit 183 derives $T_X$ after correction (second start timing) by the following equation (6).

$$T_X = T_{LV,i+1} - t_{IM} \qquad (6)$$

Case C
$T_C \geq T_{LV,i} - t_{IM}$ and
$T_C \leq T_{LV,i} + t_{LV}$

In this case, the drive time period for a still image still overlaps with the drive time period for a display image 1104 with which there was initially overlap, even when the start timing is changed to $T_C$. In other words, overlapping of the drive time periods is not resolved by changing the start timing based on the estimated position of the main subject.

In this case, the position prediction circuit 183 derives the predicted position of the main subject within the image at a start timing $T_B$ (first start timing) of the drive time period for a still image 1203 when configured to end before the start of the drive time period for a display image 1104. Also, the position prediction circuit 183 derives the position of the main subject within the image at a start timing $T_A$ (second start timing) of the drive time period for a still image 1203 when configured to start after the end of the drive time period for a display image 1104. Here, the coordinates of the predicted position of the main subject within the image at $T_B$ and $T_A$ are respectively given as $(x_B, y_B)$ and $(x_A, y_A)$ and. The position prediction circuit 183 sets the timing corresponding to whichever of the positions $(x_B, y_B)$ and $(x_A, y_A)$ is closest to the center of the field of view as $T_X$ after correction. This is because there is a high possibility that shooting the main subject at a position close to the center of the field of view will conform to the intention of the user.

More specifically, the position prediction circuit 183 corrects $T_X$ as follows.

Figure 4B:
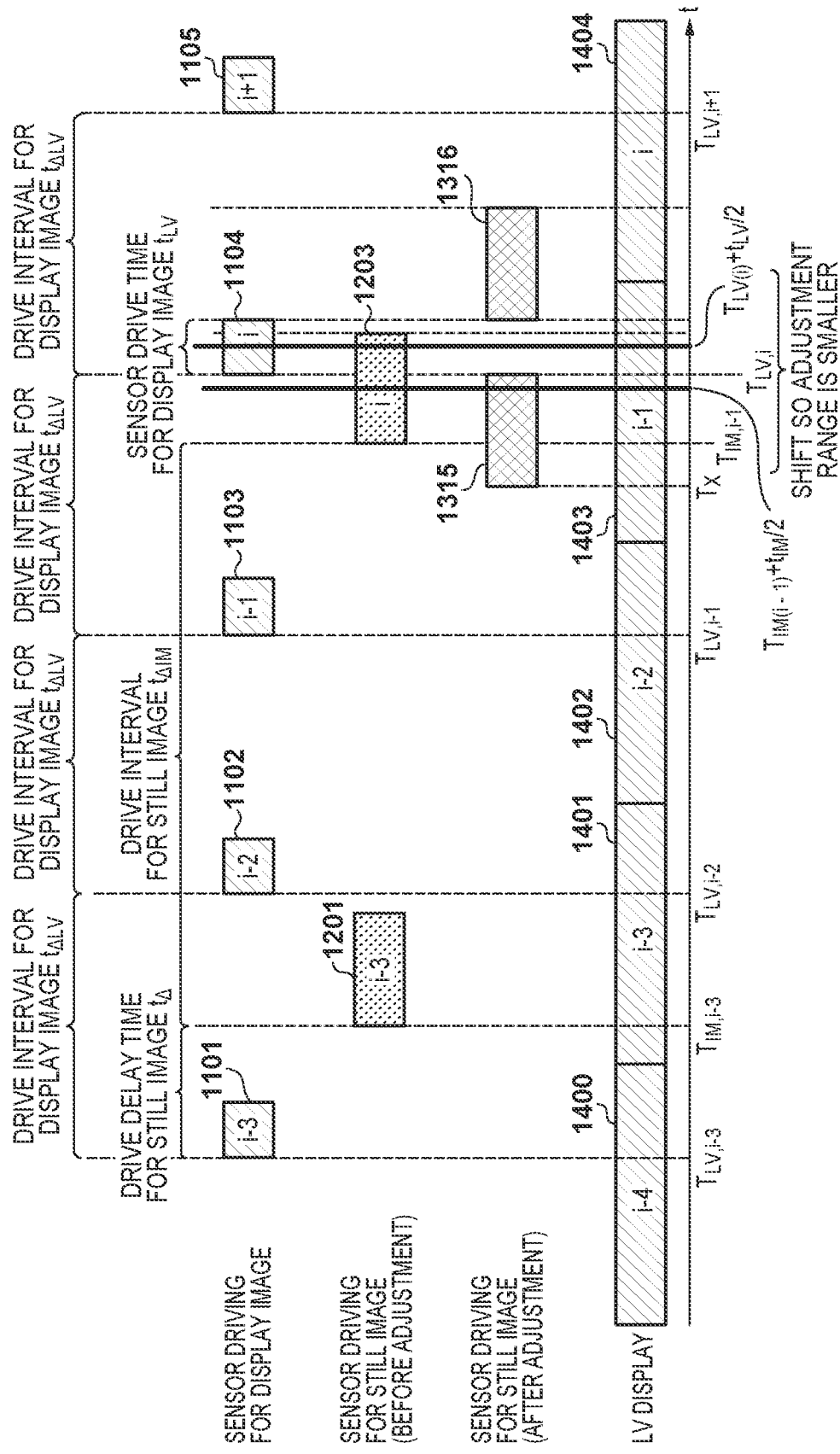

Case Ca $$T_X = T_B = T_{LV,i} - t_{IM} \qquad (7)$$

when $\sqrt{(x_B - x_C)^2 + (y_B - y_C)^2} < \sqrt{(x_A - x_C)^2 + (y_A - y_C)^2}$ Case Cb $$T_X = T_A = T_{LV,i} + t_{LV} \qquad (8)$$

when $\sqrt{(x_B - x_C)^2 + (y_B - y_C)^2} > \sqrt{(x_A - x_C)^2 + (y_A - y_C)^2}$ Also, in the case where the distances from the positions $(x_B, y_B)$ and $(x_A, y_A)$ to the center of the field of view are equal, the position prediction circuit 183 corrects $T_X$ by another method. For example, the position prediction circuit 183, as shown in FIG. 4B, corrects $T_X$ to whichever of $T_A$ and $T_B$ has the smaller difference (correction amount) from $T_C$ which is the start timing before correction. The shift from original shooting timing can thereby be lessened. Specifically:

Case Cc

When $\sqrt{(x_B - x_C)^2 + (y_B - y_C)^2} = \sqrt{(x_A - x_C)^2 + (y_A - y_C)^2}$, the position prediction circuit 183:

Case Ccα
corrects $T_X$ as follows if $$T_{IM,i} + \frac{t_{IM}}{2} \leq T_{LV,i} + \frac{t_{LV}}{2}$$

$$T_X = T_B = T_{LV,i} - t_{IM} \qquad (9)$$

Case Ccβ
and corrects $T_X$ as follows if $$T_{IM,i} + \frac{t_{IM}}{2} \leq T_{LV,i} + \frac{t_{LV}}{2}$$

$$T_X = T_A = T_{LV,i} + t_{LV} \qquad (10)$$

The condition acquisition circuit 18 (position prediction circuit 183) outputs the timing $T_X$ of the still image shooting decided in the above-described manner to the timing adjustment circuit 15. The timing adjustment circuit 15 decides the timing of the final still image shooting based on the VdLV signal, the VdIM signal and the timing $T_X$, and outputs the decided timing to the optical system drive circuit 31 and the sensor control circuit 16.

Note that the timing adjustment circuit 15, when changing the image capture timing, refers to the VdLV signal and VdIM signal that are supplied from the display timing generation circuit 13 and the still image timing generation circuit 14. The timing adjustment circuit 15 then determines whether the drive time period for a still image and the drive time period for a display image of the image sensor 17 overlap.

The condition where the drive time period for a still image having the start timing $T_{IM,i}$ overlaps with the drive time period for a display image can be represented with the following equation (11).

$$T_{LV,i} - t_{IM} < T_{IM,i} < T_{LV,i} + t_{LV} \qquad (11)$$

Figure 5:
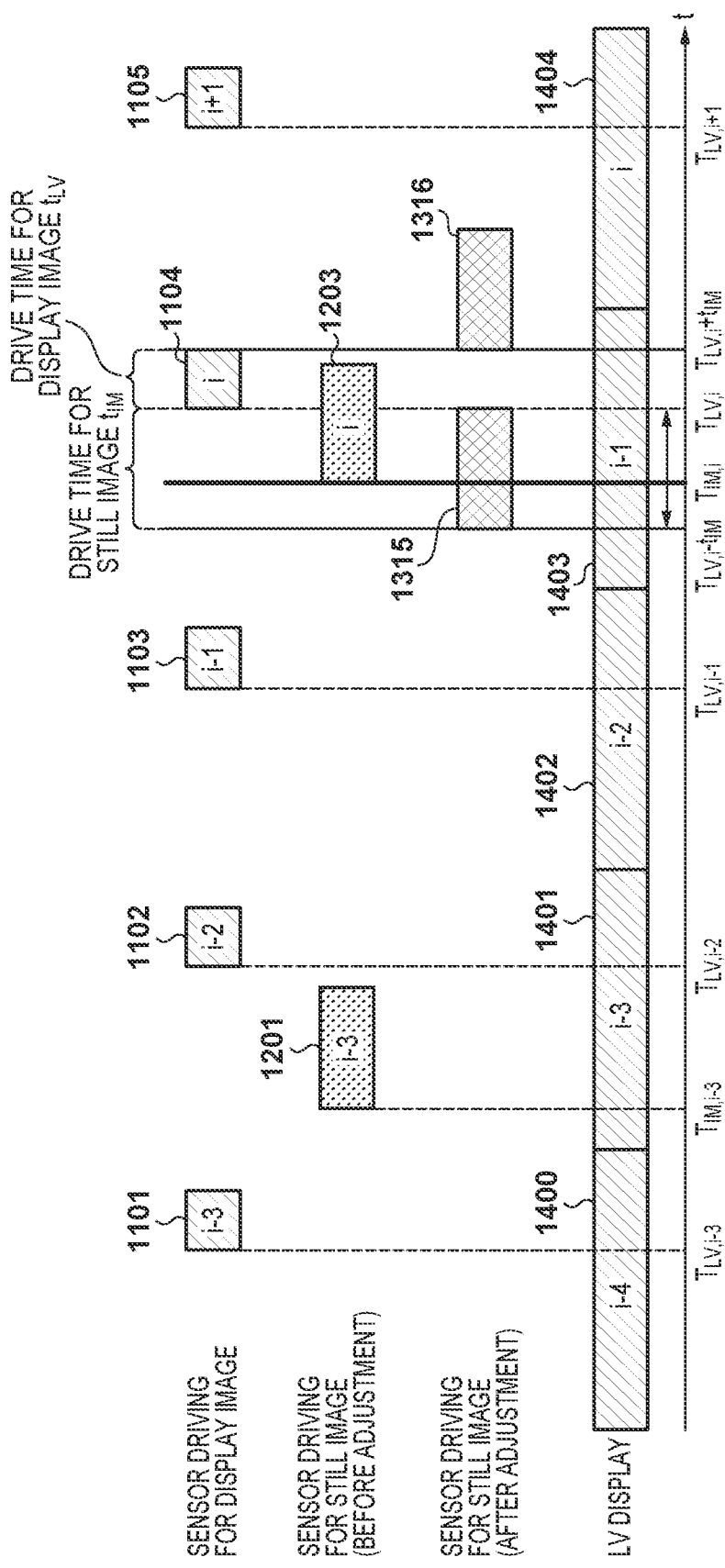
FIG. 5 is a timing chart relating to timing control operations of drive time periods according to the first embodiment.

FIG. 5 shows the range of equation (11) in which the drive time period for a still image having the start timing $T_{IM,i}$ overlaps with the drive time period for a display image.

A configuration may be adopted in which the timing adjustment circuit 15 only changes the start timing of the drive time period for a still image in the case where it is determined that the drive time period for a still image and the drive time period for a display image of the image sensor 17 overlap. In the case where it is determined that the drive time period for a display image and the drive time period for a still image do not overlap, the timing adjustment circuit 15 outputs the VdIM signal from the still image timing generation circuit 14 directly to the optical system drive circuit 31 and the sensor control circuit 16 as the drive timing signal Vd.

In this way, in the present embodiment, the time period of still image shooting is determined so as to not overlap with the time period of moving image shooting, in the case of shooting still images while performing moving image shooting for display. Thus, the user is able to accurately check the shooting range while shooting still images, without the update period of moving image display being affected by the still image shooting. Also, the time period of still image shooting, in the case of being changed so as to not overlap with the time period of moving image shooting, is changed such that still images are shot at a timing at which the position of the main subject approaches the center of the field of view, or at a timing at which the shift from the pre-change timing is small. Thus, still image shooting can be realized at a timing with a high possibility of conforming to the intention of the user.

Note that a configuration may be adopted in which, for example, the output of the timing adjustment circuit 15 is also supplied to the control circuit 12, and the control circuit 12 changes the settings of the still image timing generation circuit 14 and changes the timing of the VdIM signal. Variation in the interval with the start timing of the next still image shooting can thereby be suppressed, in the case where the timing of still image shooting is changed.

Second Embodiment

Next, a second embodiment of the present invention will be described. The present embodiment is the same as the first embodiment except for the control signals that are output by the image sensor 17 and the sensor control circuit 16, and common description will be omitted.

In the present embodiment, the individual pixels 171 arrayed in the image sensor 17 have a plurality of photoelectric conversion regions. Each pixel has a mode for reading out signals independently from the individual photoelectric conversion regions, and a mode for reading out signals collectively from all the photoelectric conversion regions. Here, each pixel 171 has two photoelectric conversion regions 171A and 171B, and the signal that is read out from the photoelectric conversion region 171A will be referred to as an A image, the signal that is read out from the photoelectric conversion region 171B will be referred to as a B image, and a signal obtained by adding together the A image and the B image will be referred to as an A+B image. An image sensor having a configuration with such pixels is able to realize phase difference AF using the A image and the B image, and is able to obtain normal shot images with the A+B image.

The A+B image and the A image are read out from the image sensor 17. The B image can be obtained by subtracting the A image from the A+B image. The B image may also be read out instead of the A image. The A+B image for live view images and the A image for autofocus are read out in the drive time period for a display image. Also, the A+B image for recording is read out in the drive time period for a still image.

In the present embodiment, in the case where it is determined that overlap with the drive time period for a display image is not resolved, even when the drive time period for a still image is changed so as to start from the timing $T_C$ that is based on the estimated position of the main subject, overlap is avoided by shortening the drive time period for a still image. Specifically, the data amount to be read out is reduced by controlling a thinning rate of images that are read out in the drive time period for a display image, and the drive time period for a still image is shortened. The timing adjustment circuit 15 decides the images to be thinned (A image only or A image and A+B image) according to the time to be shortened. The timing adjustment circuit 15 outputs the decided contents to the sensor control circuit 16.

The sensor control circuit 16 controls the readout operation of the image sensor 17, based on the input from the timing adjustment circuit 15.

Figure 6:
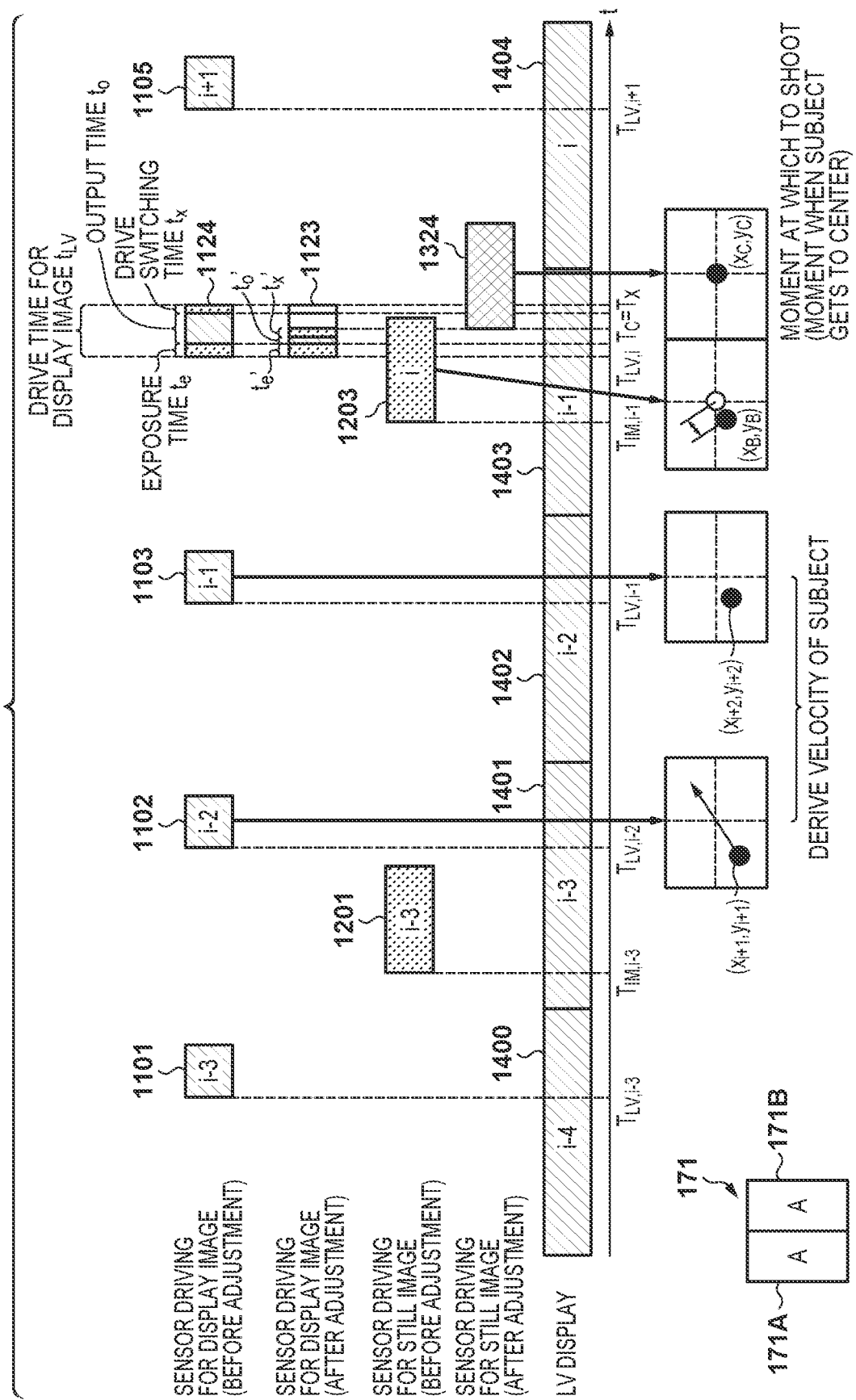
FIG. 6 is a timing chart relating to timing control operations of drive time periods according to a second embodiment.

Next, control operations of the condition acquisition circuit 18 and the timing adjustment circuit 15 in the present embodiment will be described using FIGS. 6 and 7. In FIG. 6, the same reference numerals as FIGS. 3A and 3B are given to operations that are the same as the first embodiment.

As described above, the present embodiment differs from the first embodiment in terms of the operations that are performed in the case where it is determined that overlap with the drive time period for a display image is not resolved, even when the drive time period for a still image is changed so as to start from the timing $T_C$ that is based on the estimated position of the main subject. Thus, hereinafter, these operations that differs from the first embodiment will be described.

FIG. 6 shows operations that are performed in the case where the drive time period for a still image having the start timing $T_C$ overlaps with the drive time period for a display image, when calculating $T_X$ in the present embodiment. The position prediction circuit 183 corrects $T_X$ similarly to the first embodiment, with regard to Cases A and B (drive time period for a still image from $T_C$ overlaps with the drive time period for a display images 1103 and 1105). With regard to Case C (drive time period for a still image starting from $T_C$ overlaps with drive time period for a display image 1104), the position prediction circuit 183:

Case C1 corrects $T_X$ similarly to Case C in the first embodiment, when $T_C \geq T_{LV,i} - t_{IM}$ and $T_C \leq T_{LV,i} + t_e + t_x$.

Case C2

When $T_C > T_{LV,i} + t_e + t_x$ and $T_C \leq T_{LV,i} + t_{LV}$

In this case, the position prediction circuit 183 is able to reduce the image data for display that is read out from the image sensor 17, and start the drive time period for a still image from $T_C$.

Here, the drive time period for a display image is constituted by an exposure time $t_e$, an output (readout) time $t_o$ and a drive switching time $t_x$, of the image sensor, as shown in FIG. 6. In the present embodiment, the drive time period for a display image is shortened by reducing the output time $t_o$. In FIG. 6, a drive time period for a display image 1124 indicates the state before shortening, and a drive time period for a display image 1123 indicates a state where the output time $t_o$ is shortened to $t_{o'}$.

The position prediction circuit 183 decides the images to be thinned (only A image or both A image and A+B image) and the thinning rate for each image, based on the relationship between the thinning rate and the data amount of the A image and the A+B image. Here, the A image is preferentially thinned due to the A image being for autofocus and not being used as a live view image. The position prediction circuit 183 also adds the A+B image as an image to be thinned, in the case where the desired shortened time is not obtained by only thinning the A image. The thinning can be performed in units of pixel rows of the image sensor 17, for example.

Figure 7:
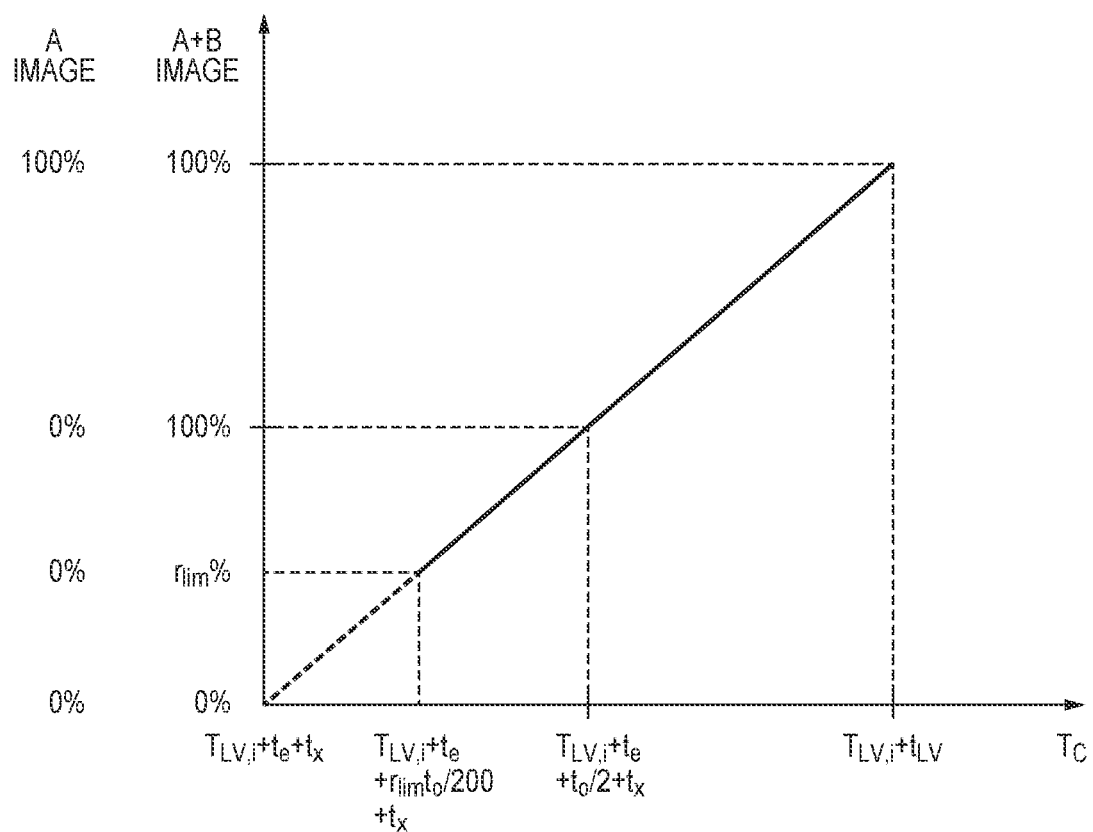
FIG. 7 is a diagram relating to operations for shortening the drive time period for a display image according to the second embodiment.

FIG. 7 shows $T_C$ and an example of the relationship between the images to be thinned and the thinning rate. The data amount of the A+B image is 100% (thinning rate 0%), when $T_C$ is $T_{LV,i} + t_e + t_o/2 + t_x$ from $T_{LV,i} + t_{LV}$. Also, with regard to the A image, the thinning rate is linearly decided, such that the data amount is 100% (thinning rate 0%) at $T_C = T_{LV,i} + t_{LV}$, and the data amount is 0% (thinning rate 100%) when $T_C = T_{LV,i} + t_e + t_o/2 + t_x$.

Furthermore, the A+B image is thinned when $T_C$ is less than $T_{LV,i}+t_e+t_o/2+t_x$. The thinning rate is linearly decided, such that the data amount of the A+B image will be $r_{lim}$ % (thinning rate 100−$r_{lim}$ %) when $T_C=T_{LV,i}+t_e+(r_{lim}t_o)/200+t_x$. Here, $r_{lim}$ can be decided in advance with consideration for factors such as the display quality of live view images. The maximum thinning rate of the A+B image is (100−$r_{lim}$) %.

The resolution of live view images decreases when the data amount of the A+B image is reduced. However, for the purpose of checking the shooting range, performing display at a constant update frequency is greatly advantageous even if image quality is slightly reduced, rather than the frequency varying or blackouts occurring.

The position prediction circuit 183 pre-stores a table or a function representing the relationship shown in FIG. 7, and decides the thinning rate of the A image and the A+B image or the percentage of the data amount after reduction using the value of $T_C$.

The condition acquisition circuit 18 (position prediction circuit 183) outputs the timing $T_X$ of still image shooting decided in the above-described manner to the timing adjustment circuit 15. Also, the position prediction circuit 183, in the case where shortening of the drive time period for a display image is required, also outputs the images to be thinned and the thinning rate to the timing adjustment circuit 15.

The timing adjustment circuit 15 decides the timing of the final still image shooting based on the VdLV signal, the VdIM signal and the timing $T_X$, and outputs the decided timing to the optical system drive circuit 31 and the sensor control circuit 16. Note that, in the case where the images to be thinned and the thinning rate are provided from the condition acquisition circuit 18, the timing adjustment circuit 15 notifies the images to be thinned and the thinning rate to the sensor control circuit 16. The sensor control circuit 16 controls the readout operation according to the notified images to be thinned and thinning rate, in relation to the drive time period for a display image immediately before the drive time period for a still image.

According to the present embodiment, in addition to similar effects to the first embodiment, the possibility of still images being shot at a timing at which the position of the main subject approaches the center of the field of view can be enhanced, by reducing the data amount of images for display if required.

Variation 1 of First Embodiment

The reduction of image data for display in the second embodiment is particularly effective in a configuration that reads out the A image (or B image) in addition to the normal image (A+B image) in the drive time period for a display image. However, this reduction can also be implemented in the first embodiment. In this case, although there is an immediate decrease in the image quality of live view images, the data amount that is read out in the drive time period for a display image can be reduced in a range from a thinning rate of 0% to the maximum thinning rate of (100−$r_{lim}$) %.

Figure 8:
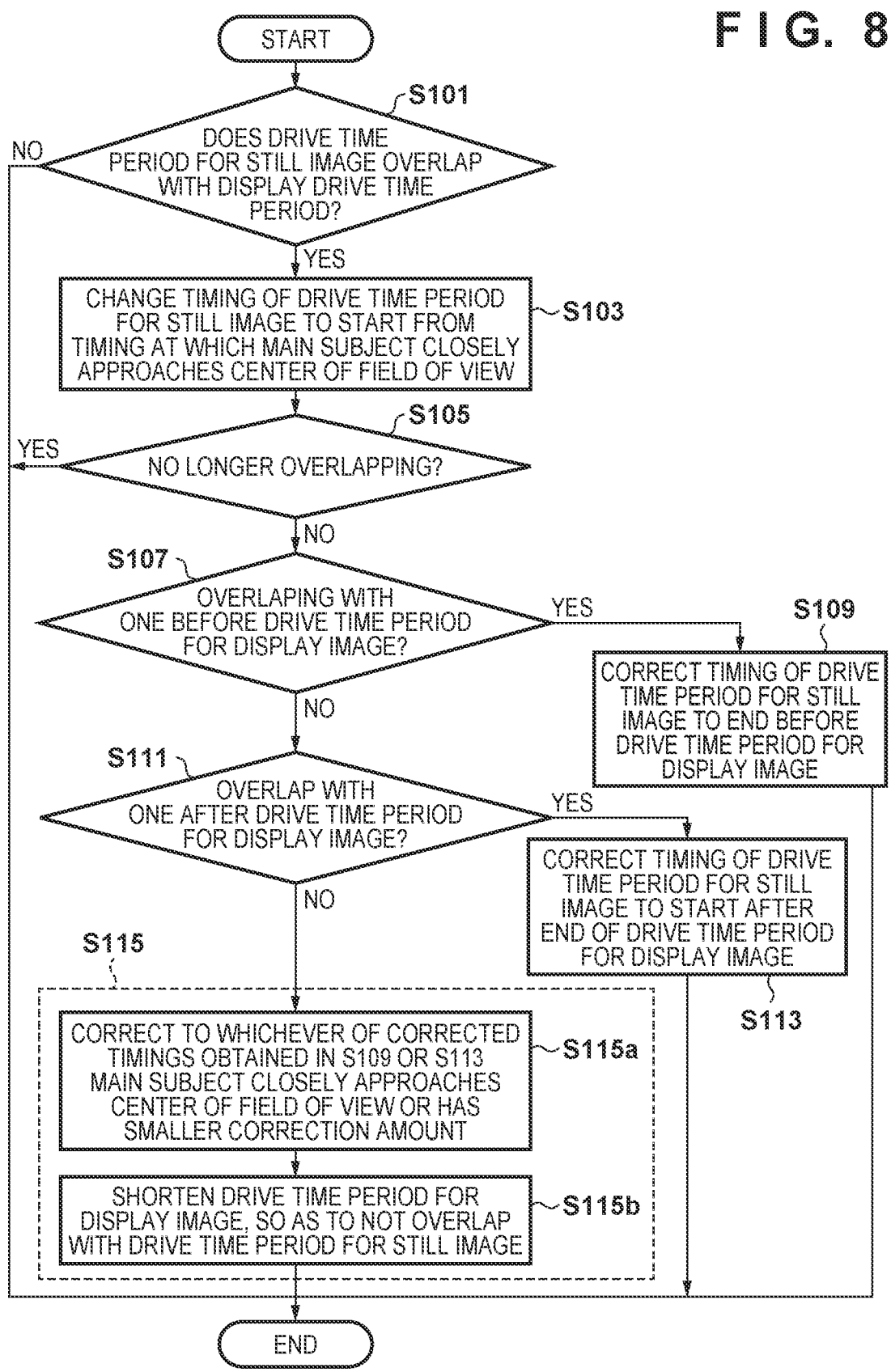
FIG. 8 is a flowchart relating to timing control operations of drive time periods according to an embodiment.

FIG. 8 is a flowchart relating to operations of the condition acquisition circuit 18 in the abovementioned embodiment.

In step S101, the condition acquisition circuit 18 determines whether the drive time period for a still image overlaps with the drive time period for a display image, and advances the processing to step S103 if it is determined that the drive time period for a still image overlaps, and ends the processing if it is not judged that the drive time period for a still image overlaps.

In step S103, the condition acquisition circuit 18 derives the timing $T_C$ at which the main subject approaches the center of the field of view, based on the movement velocity and direction of the main subject. The condition acquisition circuit 18 then changes the drive time period for a still image to start from the timing $T_C$.

In step S105, the condition acquisition circuit 18 determines whether the drive time period for a still image no longer overlaps with the drive time period for a display image, and ends the processing if it is determined that the drive time period for a still image no longer overlaps, and advances the processing to step S107 if it is not determined that the drive time period for a still image no longer overlaps.

In step S107, the condition acquisition circuit 18 determines whether the changed drive time period for a still image overlaps with the drive time period for a display image one before the drive time period for a display image (target drive time period for a display image) with which overlap was determined in step S101. The condition acquisition circuit 18 advances the processing to step S109 if it is determined that the changed drive time period for a still image overlaps with the drive time period for a display image one before, and advances the processing to step S111 if it is not determined that the changed drive time period for a still image overlaps with the drive time period for a display image one before.

In step S109, the condition acquisition circuit 18 corrects the drive time period for a still image to end before the target drive time period for a display image and so as to not overlap with other drive time period for a display images, and ends the processing.

In step S111, the condition acquisition circuit 18 determines whether the changed drive time period for a still image overlaps with the drive time period for a display image one after the target drive time period for a display image. The condition acquisition circuit 18 advances the processing to step S113 if it is determined that the changed drive time period for a still image overlaps with the drive time period for a display image one after, and advances the processing to step S115 if it is not determined that the changed drive time period for a still image overlaps with the drive time period for a display image one after.

In step S113, the condition acquisition circuit 18 corrects the drive time period for a still image to start after the end of the target drive time period for a display image and so as to not overlap with other drive time period for a display images, and ends the processing.

Step S115 includes steps S115a and S115b, with step S115a corresponding to processing in the first embodiment, and step S115b corresponding to processing in the second embodiment. The condition acquisition circuit 18 executes one or both of steps S115a and S115b, and ends the processing.

In step S115a, the condition acquisition circuit 18 corrects the drive time period for a still image to start from whichever of the timings $T_A$ and $T_B$ obtained in step S109 and step S113 is the timing at which the main subject most closely approaches the center of the field of view, and ends the processing. Alternatively, the condition acquisition circuit 18 corrects the drive time period for a still image such that whichever of the timings $T_A$ and $T_B$ has the smallest difference (correction amount) from the start timing $T_C$ is taken as the start timing.

In step S115b, the condition acquisition circuit 18 shortens the drive time period for a display image, so as to not overlap with the drive time period for a still image that starts from the timing $T_C$. As described above, the condition acquisition circuit 18 shortens the drive time period for a display image by reducing the amount of image data that is read out in the drive time period for a display image.

Variation 2 of First Embodiment

A variation of Case C in the first embodiment will be described. In the first embodiment, in Case C, in the case of there being equal distance to the center of the field of view from the coordinates of the predicted positions of the main subject within the image at the start timing $T_B$ (first start timing) of the drive time period for a still image 1203 when changed to end before the start of the drive time period for a display image 1104 and at the start timing $T_A$ (second start timing) of the drive time period for a still image when changed to start after the end of the drive time period for a display image 1104, the start timing of the drive time period for a still image 1203 is corrected to whichever of the start timings $T_B$ and $T_A$ has the smaller shift from the drive time period for a still image 1203 before correction (Case Ccα and Case Ccβ). However, a similar correction can also be performed in the case where the distances from the coordinates of the predicted positions of the main subject within the image at the start timings $T_A$ and $T_B$ to the center of the field of view are not equal. That is, the start timing of the drive time period for a still image may be corrected with priority given to reducing the shift in the shooting timing over the main subject being close to the center of the field of view (Case C3).

For example, in the case where the settings of the image capture apparatus 100 meet a specific condition, the start timing of the drive time period for a still image can be corrected with priority given to reducing the shift in the shooting timing. A configuration may, for example, be adopted in which the specific condition is set to a shutter release timing priority mode or in which the shooting mode is set to prioritize the shutter release timing in the image capture apparatus 100, or other conditions may be set.

FIG. 9 is a flowchart relating to the operations of the condition acquisition circuit 18 in this variation. Operational steps that are similar to the first embodiment are given the same reference numerals as FIG. 8, and description thereof will be omitted. In step S105, the condition acquisition circuit 18 executes step S121, if it is not determined that the drive time period for a still image no longer overlaps with the drive time period for a display image.

In step S121, the condition acquisition circuit 18 determines whether the image capture apparatus 100 is in a shutter release timing priority state. This determination corresponds to the abovementioned determination of whether the specific condition is met. The condition acquisition circuit 18 advances the processing to step S123 if it is determined that the image capture apparatus 100 is in the shutter release timing priority state, and executes the operations from step S107 in FIG. 8 if it is not determined that the image capture apparatus 100 is in the shutter release timing priority state.

In step S123, the condition acquisition circuit 18 corrects the drive time period for a still image such that whichever of the timings $T_A$ and $T_B$ has the smaller difference (correction amount) from the start timing $T_C$ before correction is taken as the start timing.

According to this variation, shooting becomes possible at a timing at which the main subject is closer to the center of the field of view and the shift in shooting timing is small.

Variation 3 of First Embodiment

A variation 3 of the first embodiment will be described. Images for display can be utilized in the evaluation value calculation processing by the image processing circuit 19, apart from being utilized in live view display. Also, images for evaluation can be shot, in order to increase the calculation frequency of the evaluation value over the shooting interval (reciprocal of framerate) of the images for display. For example, in the case where the display framerate is 30 fps, shooting can be performed at 60 fps, and the evaluation value calculation processing can be implemented for each frame, and generation of the image for display can be implemented every other frame. The frames that are not used in generating the image for display, out of the frame images shot at 60 fps, will be referred to as images for evaluation, and the drive time period of the image sensor 17 for shooting the images for evaluation will be referred to as an evaluation drive time period (third drive time period). The length of the evaluation drive time period is equal to the length of the drive time period for a display image.

In this variation, in the case where the drive time period for a still image overlaps with the drive time period for a display image, the start timing of the drive time period for a still image can be controlled in a similar manner to the first embodiment or variation 2 of the first embodiment.

Also, in the case where the drive time period for a still image overlaps with the evaluation drive time period, the condition acquisition circuit 18 and the timing adjustment circuit 15 adjust the evaluation drive time period so as to not overlap with the drive time period for a still image, without changing the start timing of the drive time period for a still image. Specifically, the condition acquisition circuit 18 and the timing adjustment circuit 15 are able to adjust the evaluation drive time period by one of the following:
1) Shifting the start timing of the evaluation drive time period
2) Shortening the evaluation drive time period
3) Eliminating the evaluation drive time period The condition acquisition circuit 18 and the timing adjustment circuit 15 may fixedly or selectively implement one of these three adjustment methods. Alternatively, a plurality of adjustment methods may be implemented stepwise. For example, the condition acquisition circuit 18, first, shifts the start timing of the evaluation drive time period either back or forward so as to not overlap with the drive time period for a still image. In the case where the evaluation drive time period overlaps with the drive time period for a display image whichever way the start timing is shifted, the condition acquisition circuit 18 shortens the evaluation drive time period. In the case where overlap with the drive time period for a display image is not eliminated even when the evaluation drive time period is shortened to a predetermined minimum drive time period, the condition acquisition circuit 18 eliminates the evaluation drive time period (skips acquisition of an image for evaluation).

Since images for evaluation are not used in live view display, priority is set lower than for still image shooting or shooting for live view display. Thus, in the case where overlap with the drive time period for a still image or the drive time period for a display image cannot be not avoided even when the evaluation drive time period is adjusted, acquisition of an image for evaluation is skipped. According to this variation, similar effects to the first embodiment and variations thereof can also be realized in the case of acquiring images for evaluation.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-088567, filed on May 8, 2019 and Japanese Patent Application No. 2020-020887, filed on Feb. 10, 2020, which are hereby incorporated by reference herein in their entirety.

What is claimed is:

1. An image capture apparatus comprising:
an image sensor;
an adjustment circuit that controls the image sensor; and
a prediction circuit that predicts a position of a main subject within a field of view, based on a movement direction and a movement amount of the main subject that are detected from a moving image captured by the image sensor,
wherein when capturing a moving image for live view display by the image sensor, the adjustment circuit controls the image sensor to have a first drive time period with a first cycle determined by a framerate of the live view display,
wherein when continuously capturing still images by the image sensor, the adjustment circuit controls the image sensor to have a second drive time period with a second cycle, and
wherein the adjustment circuit, in a case where the second drive time period overlaps with the first drive time period, changes a start timing of the second drive time period based on a predicted position of the main subject predicted by the prediction circuit based on the moving image for the live view display.

2. The image capture apparatus according to claim 1, wherein
the prediction circuit further predicts a timing at which the main subject most closely approaches a specific position within the field of view, and
wherein the adjustment circuit, in the case where the second drive time period overlaps with the first drive time period, changes the start timing of the second drive time period to the timing predicted by the prediction circuit.

3. The image capture apparatus according to claim 1, further comprising:
a correction circuit that, in a case where the second drive time period after the start timing was changed overlaps with the first drive time period, corrects the start timing so as to eliminate the overlap.

4. The image capture apparatus according to claim 3, wherein the correction circuit, in a case where the second drive time period after the start timing was changed overlaps with the first drive time period one after the first drive time period with which there was initially overlap, corrects the start timing of the second drive time period, such that the second drive time period starts after an end of the first drive time period with which there was initially overlap and does not overlap with any of the first drive time periods.

5. The image capture apparatus according to claim 3, wherein the correction circuit, in a case where the second drive time period after the start timing was changed overlaps with the first drive time period one before the first drive time period with which there was initially overlap, corrects the start timing of the second drive time period, such that the second drive time period ends before the first drive time period with which there was initially overlap and does not overlap with any of the first drive time periods.

6. The image capture apparatus according to claim 3, wherein the correction circuit, in a case where the second drive time period after the start timing was changed overlaps with the first drive time period with which there was initially overlap, corrects the start timing of the second drive time period to one of:
a first start timing of the second drive time period at which the second drive time period starts after an end of the first drive time period with which there was initially overlap and does not overlap with any of the first drive time periods, and
a second start timing of the second drive time period at which the second drive time period starts before the first drive time period with which there was initially overlap and does not overlap with any of the first drive time periods.

7. The image capture apparatus according to claim 6, wherein the correction circuit corrects the start timing of the second drive time period to whichever of the first start timing and the second start timing is a timing at which the predicted position of the main subject is closer to a specific position within the field of view.

8. The image capture apparatus according to claim 6, wherein the correction circuit corrects the start timing of the second drive time period to whichever of the first start timing and the second start timing is a timing at which a difference from the start timing before correction is smaller.

9. The image capture apparatus according to claim 6, wherein the correction circuit:
in a case where it is determined that the image capture apparatus is in a shutter release timing priority state, corrects the start timing of the second drive time period to whichever of the first start timing and the second start timing is a timing at which a difference from the start timing before correction is smaller, and
in a case where it is not determined that the image capture apparatus is in the shutter release timing priority state, corrects the start timing of the second drive time period to whichever of the first start timing and the second start timing is a timing at which the predicted position of the main subject is closer to a specific position within the field of view.

10. The image capture apparatus according to claim 6, wherein the correction circuit, in a case where the first drive time period that overlaps with the second drive time period after the start timing was changed is a drive time period for shooting a frame image that is not used in generating an image for display, adjusts the first drive time period so as to not overlap with the second drive time period after the start timing was changed.

11. The image capture apparatus according to claim 10, wherein the correction circuit adjusts the first drive time period, by shifting a start timing of the first drive time period, shortening the first drive time period, or eliminating the first drive time period.

12. The image capture apparatus according to claim 3, wherein the correction circuit, in a case where the second drive time period after the start timing was changed overlaps with the first drive time period with which there was initially overlap, shortens the first drive time period with which there was initially overlap by reducing an amount of data to be read out from the image sensor in the first drive time period with which there was initially overlap, and eliminates the overlap.

13. The image capture apparatus according to claim 12, wherein, in a case of reading out data for autofocus and image data for display from the image sensor in the first drive time period, the correction circuit preferentially reduces the amount of data for autofocus to be read out in the first drive time period.

14. A control method for an image capture apparatus that includes an image sensor, the method comprising:
controlling the image sensor to have a first drive time period with a first cycle determined by a framerate of live view display, when capturing a moving image for the live view display by the image sensor;
controlling the image sensor to have a second drive time period with a second cycle, when continuously capturing still images by the image sensor,
predicting a position of a main subject within a field of view, based on a movement direction and a movement amount of the main subject that are detected from a moving image captured by the image sensor, and
changing, in a case where a second drive time period overlaps with a first drive time period, a start timing of the second drive time period based on a predicted position of the main subject predicted in the predicting based on the moving image for the live view display.

15. A non-transitory computer-readable storage medium storing a computer program for causing a computer included in an image capture apparatus to execute a control method of the image capture apparatus, the method comprising:
controlling an image sensor of the image capture apparatus to have a first drive time period with a first cycle determined by a framerate of live view display, when capturing a moving image for the live view display by the image sensor;
controlling the image sensor to have a second drive time period with a second cycle, when continuously capturing still images by the image sensor,
predicting a position of a main subject within a field of view, based on a movement direction and a movement amount of the main subject that are detected from a moving image captured by the image sensor, and
changing, in a case where a second drive time period overlaps with a first drive time period, a start timing of the second drive time period based on a predicted position of the main subject predicted by the predicting based on the moving image for the live view display.

* * * * *